Jan. 26, 1965     R. P. ROHDE     3,167,020
PULSATING POWER UNIT DEVICES

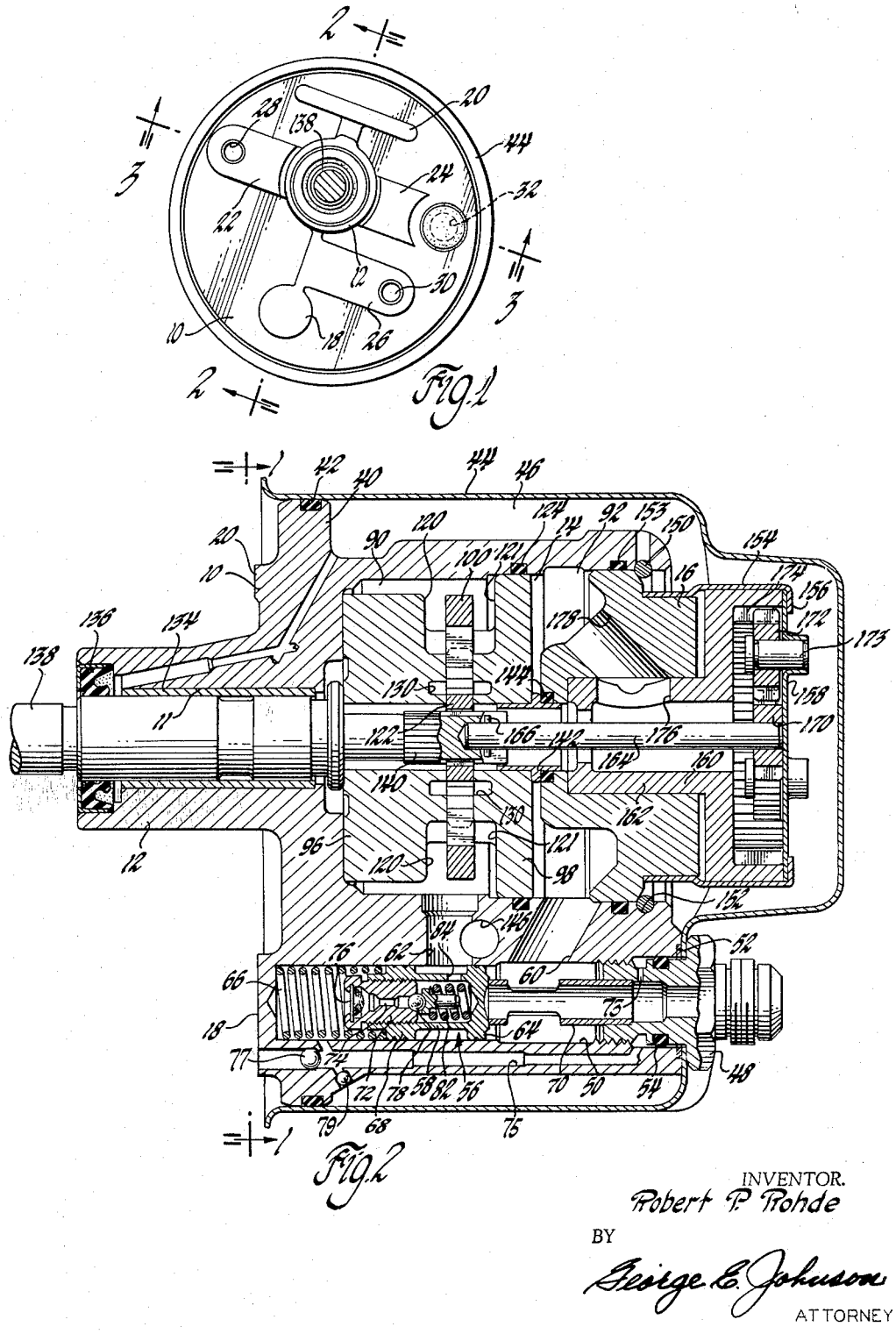
Jan. 26, 1965 — R. P. ROHDE — 3,167,020
PULSATING POWER UNIT DEVICES
Filed Sept. 27, 1963 — 4 Sheets-Sheet 1
INVENTOR.
Robert P. Rohde
BY
George E. Johnson
ATTORNEY

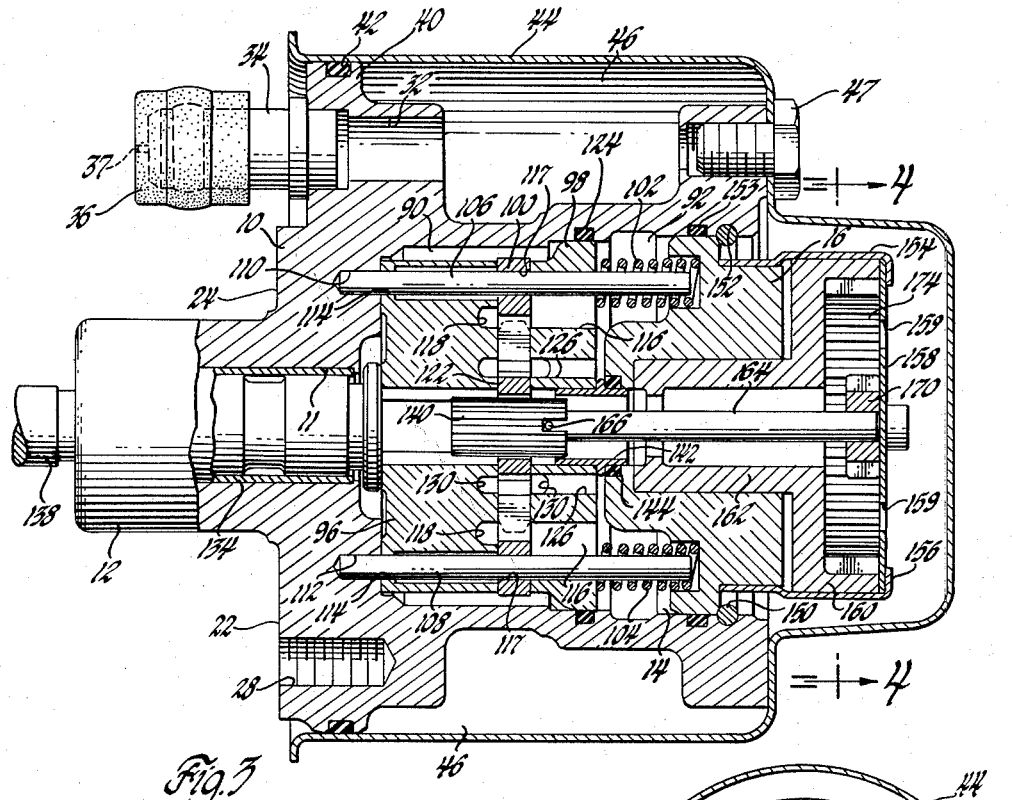

Filed Sept. 27, 1963     4 Sheets-Sheet 3

INVENTOR.
Robert P. Rohde
BY
George E. Johnson
ATTORNEY

United States Patent Office
3,167,020
Patented Jan. 26, 1965

1

3,167,020
PULSATING POWER UNIT DEVICES
Robert P. Rohde, Saginaw, Mich., assignor to General Motors Corporation, Detroit, Mich., a corporation of Delaware
Filed Sept. 27, 1963, Ser. No. 312,130
13 Claims. (Cl. 103—41)

This invention relates to devices for the supplying of pulsating fluid pressure and more particularly to units for converting mechanical torque to pulsating fluid pressure and making the latter available to apply a dithering or reciprocating action to a device such as a piston, diaphragm, or a pumping arrangement. An example of the application of a pulsating power supply is the use of oil under pulsating pressure to reciprocate a diaphragm in turn effecting the circulation of a refrigerant in an air conditioning installation. Many other uses may easily be visualized.

An object of the present invention is to provide a power unit in which a pulsating liquid pressure may be effected by the conversion of torque applied to the unit and in the absence of any substantial liquid flow.

A feature of the invention is a pump structure having a pressure operated valve controlling a connection between two different pressure sides of the pump whereby a pulsating fluid pressure effect is made available. Another feature is a pump structure having a valve controlling a connection between high and reservoir supply pressure sides of the pump and a power output line. A third feature is a pump structure having a valve controlling a connection between high pressure and suction sides of the pump and a power output line.

These and other important features of the invention will now be described in detail in the specification and then pointed out more particularly in the appended claims.

In the drawings:

FIGURE 1 is a view, drawn to a reduced scale, looking in the direction of the arrows 1—1 in FIGURE 2;

FIGURE 2 is a sectional view of a pulsating power unit adapted to operate between high and ambient pressures and taken as looking in the direction of the arrows 2—2 in FIGURE 1;

FIGURE 3 is a view similar to that of FIGURE 2 but looking in the direction of the arrows 3—3 in FIGURE 1;

FIGURE 4 is a sectional view looking in the direction of the arrows 4—4 in FIGURE 3;

FIGURE 5 is an exploded and perspective view of internal pump parts shown in FIGURES 2 and 3;

Figure 6:
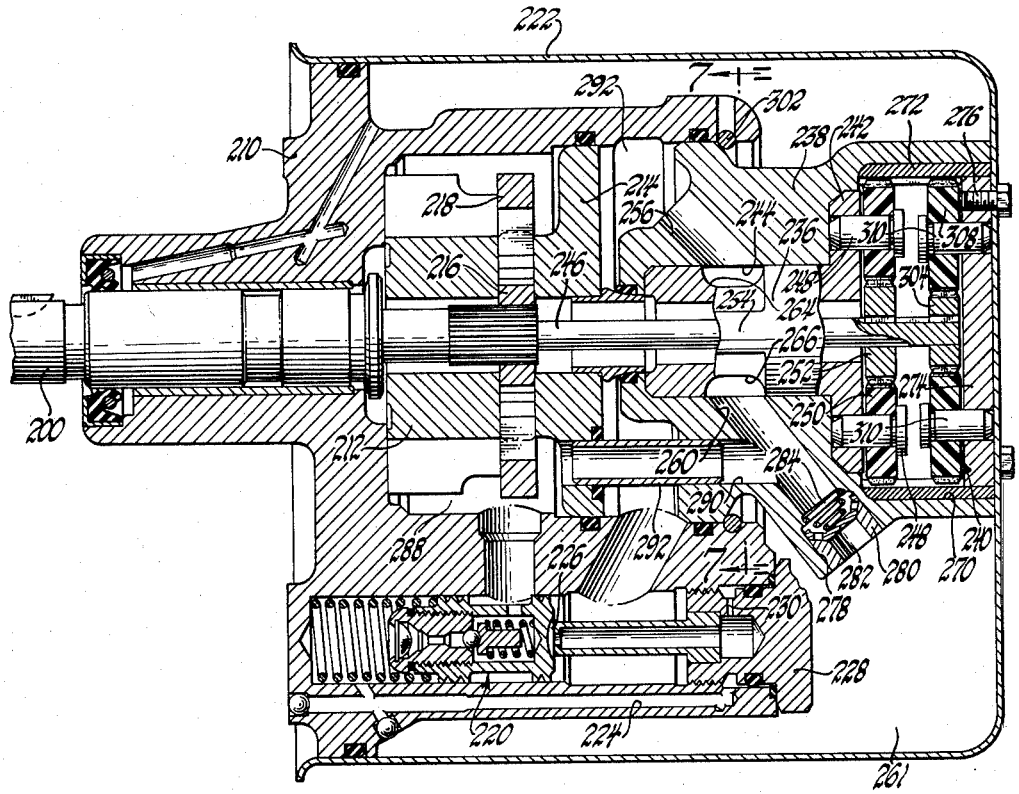
FIGURE 6 is a cross-sectional view looking in the direction of the arrows 6—6 in FIGURE 7 and similar to that of FIGURE 2 but showing a modified construction adapted to operate between high and suction pressures.

The power unit of FIGURES 1, 2 and 3 includes a pump body 10 which comprises a casing with a bore 11 passing through a hub portion 12 and an interior chamber 14 closed by a valve body 16. The hub portion 12 and the valve body 16 are at opposite ends of the body 10. Bosses 18, 20, 22, 24 and 26 (FIG. 1) are formed on one end of the pump body 10 to present surfaces in one plane for abutting a fixed supporting surface of whatever equipment is utilized from which power or torque may be imparted to the unit. The bosses 22 and 26 bear threaded holes 28 and 30 to facilitate firm mounting. A port 32 is provided for filling the unit with oil and this port is fitted with a nipple 34 and a closure cap 36 with a vent 37. In practice the oil level within the unit is kept below the vent.

An annular and radial flange 40 is formed on the pump body 10 and it is grooved to retain a sealing ring 42 which is adapted to form a seal around the interior wall surface of an outer casing 44. This casing is cup-like in shape and cooperates with the pumping body 10 in defining a low pressure reserve chamber 46. This outer casing 44 is fixed to the body 10 by means of a bolt 47 and also an outlet fitting 48. The latter is screwed tightly into a passage 50 of the body 10 and made fluid-tight by means of an annular flat gasket 52 and an annular sealing ring 54, well illustrated in FIGURE 2. The passage 50 also accommodates a pressure relief valve generally indicated at 56. This relief valves includes a double land valve 58 movable to control flow from a passage 60 to a passage 62 both formed in the body 10. One of the lands of the valve 56 is shown at 64 as being located between adjacent ends of the passages 60 and 62 to serve as the direct flow controlling portion of the valve. A coil spring 66 is placed to act against the other land 68 of the valve and resiliently urge the latter toward a ported tube member 70 which is retained in fixed relation to the outlet fitting 48. Inside the valve member 56 is a threaded plug 72 bearing an axial passage 74. The latter passage is provided with a filtering screen 76 at one end and a check valve at the other end. The check valve includes a ball 78 urged to seat on the plug 72 by means of a plunger 80 and a coil spring 82. The valve 58 bears a port 84 between the lands 64 and 68 so placed as continually to communicate with the passage 62.

A radial passage 73 is formed in the fitting 48 and is so placed as continuously to connect the passage 50 to the chamber of the spring 66 by means of a passage 75 formed in the body 10. The passage 75 is sealed at 77 and 79.

The interior chamber 14 of the pump body 10 is divided into a main low pressure chamber 90 and a high pressure chamber 92. The main low pressure chamber 90 is determined by the interior wall of the interior chamber 14 and two pressure plates 96 and 98 as well as a pump ring 100 resiliently clamped between the pressure plates. The pressure plates and the pump ring 100 are held in place by means of two coil springs 102 and 104 (FIG. 3) which act between the valve body 16 and the pressure plate 98. The springs, pressure plates and the pump ring are held nonrotatively in position by means of two pins 106 and 108. The springs 102 and 104 surround ends of the pins 106 and 108 and the other ends of the pins are retained in bores 110 and 112 formed in the pump body 10. A clearance is left, in the assembly, between each pin and the valve body 16.

The pressure plates 96 and 98 and the pump ring 100 bear apertures 114, 116 and 117 respectively and through which the pins 106 and 108 extend. Each of the two apertures 116 is irregularly shaped as best illustrated in FIGURE 5. Registering with these two apertures are recesses 118 formed in the pressure plate 96. Each aperture 118 communicates with an aperture 116 to provide a high pressure fluid outlet to the high pressure chamber 92. As the pump is of the double acting type, the pressure plates 96 and 98 are also provided with two sets of registering inlet notches 120 and 121 for admitting fluid from the main low pressure chamber 90 to the conventional two arcuate spaces between the periphery of the bladed rotor 122 and the inside surface of the ring 100.

The pressure plate 98 is in sealed relation with the interior surface presented by the pump body 10 by use of a sealing ring 124. The plate 98 is also provided with two ports 126 (FIG. 3) connecting the high pressure chamber 92 to arcuate recesses 130 formed in the facing surfaces of the pressure plates. Further details regarding the double action bladed rotor pump structure is not presented herein as such specific structure is conventional and not a necessary part of the present invention. Features not specifically claimed or disclosed herein are similar to those disclosed in the United States application for patent S.N. 762,162 filed September 19, 1958, in the names of R. P. Rohde, W. B. Thompson and P. B. Zeigler and its corresponding British Patent 861,497 published February 22, 1961.

The hub portion 12 is bored to receive a bushing 134 and sealing means 136 for the journaling of a drive shaft 138. This shaft extends into the interior chamber 14 of the pump body 10 and carries a splined portion 140 engaged with the pump rotor 122.

A short spacing tube 142 and a sealing ring 144 are utilized to form a tight seal between the pressure plate 98 and the valve body 16.

The low pressure chamber 46 is connected to the passage 62 by a bore 146, a cross section of which is as seen in FIGURE 2. The bore 146 is shown in no other figure as it merely extends as a somewhat restricted connection to the outside of the pump body 10—i.e.—to the reserve or reservoir chamber 46.

The valve body 16 is tightly held within the chamber 14 by a split metal ring 150 which is retained within a groove 152 formed in the body 10. Adjacent to the metal ring 150 is placed a sealing ring or washer 153. An annular sheet metal retainer 154 is firmly pressed into tight relation with the valve body 16 and is inwardly flanged at 156 to retain a non-rotatable plate 158 and a sleeve valve 160. The plate 158 has two ports or openings 159. The sleeve valve has a reduced diameter portion 162 which is axially apertured freely to receive a shaft 164. One end of the latter extends through the tube 142 and is keyed as at 166 to the splined portion 140. The other end of the shaft 164 abuts the plate 158 but is free to rotate with relation thereto. This other end of the shaft 164 has a gear 170 keyed to it and positioned to rotate three gears 172 each of which is free to turn on a headed stub shaft 173. Each stub shaft is fixed to the plate 158 to retain its gear in proper relation with the gear 170 and ring gear teeth 174 which are integral with the sleeve valve 160. The reduced diameter portion 162 of the sleeve valve bears a port 176 (FIG. 2) which is adapted to register with an obliquely extending passage 178 formed in the valve body 16. It will be understood that complete registry of the port 176 with the passage 178 is intended to occur only once during each revolution of the sleeve valve 160 as will further appear.

Assuming that the left-hand side of the unit as depicted in FIGURES 2 and 3 is firmly held against a supporting surface and that the drive shaft 138 is rotated by a suitable motor, a fluid such as oil partially filling the unit will be urged from the main low pressure chamber 90 by way of the notches 120 and 121 to the pumping chambers within the pump ring 100 and from there through the apertures 116 of the pressure plate 98 to the high pressure chamber 92. The sleeve valve 160 will rotate at a rate slower than that of the shaft 138 and the shaft 164 because of the planetary gear set arrangement. As a result, the pressure in the chamber 92 will be pulsating by the intermittent release of the pressure in that chamber through the passage 178 and the port 176 as well as by way of the openings 159 in the plate 158 which are in open communication with the low, ambient or reservoir pressure chamber 46 with its vent 37. If there should be any perceptible flow of fluid through the openings 159 to the reservoir or ambient pressure chamber 46, it will be returned to the low pressure side or the suction chamber 90 of the pump by way of the passages 146 and 62 seen in FIGURE 2. The pulsing of the pressure in the high pressure chamber 92 may be employed in operating some other device by means of the connection 48 which communicates through side slots in the tube 70 and the passage 60 with the chamber 92.

The pressure relief valve 56 opens when the pressure in the chamber 92 exceeds a predetermined value. This allows a small flow of oil to flow through the passage 75 to the chamber of spring 66. This flow extends through the passage 74 and into the passage 62. The resulting pressure unbalance serves to move the land 64 and to compress the spring 66. This permits oil to bypass the land 64 from the passage 60 to the passage 62.

Figure 7:
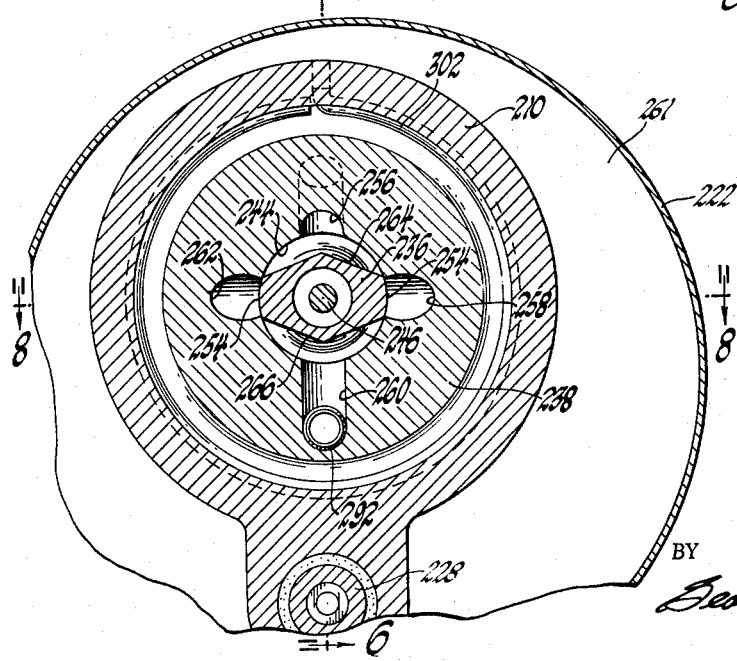
FIGURE 7 is a sectional view looking in the direction of the arrows 7—7 in FIGURE 6.
Figure 8:
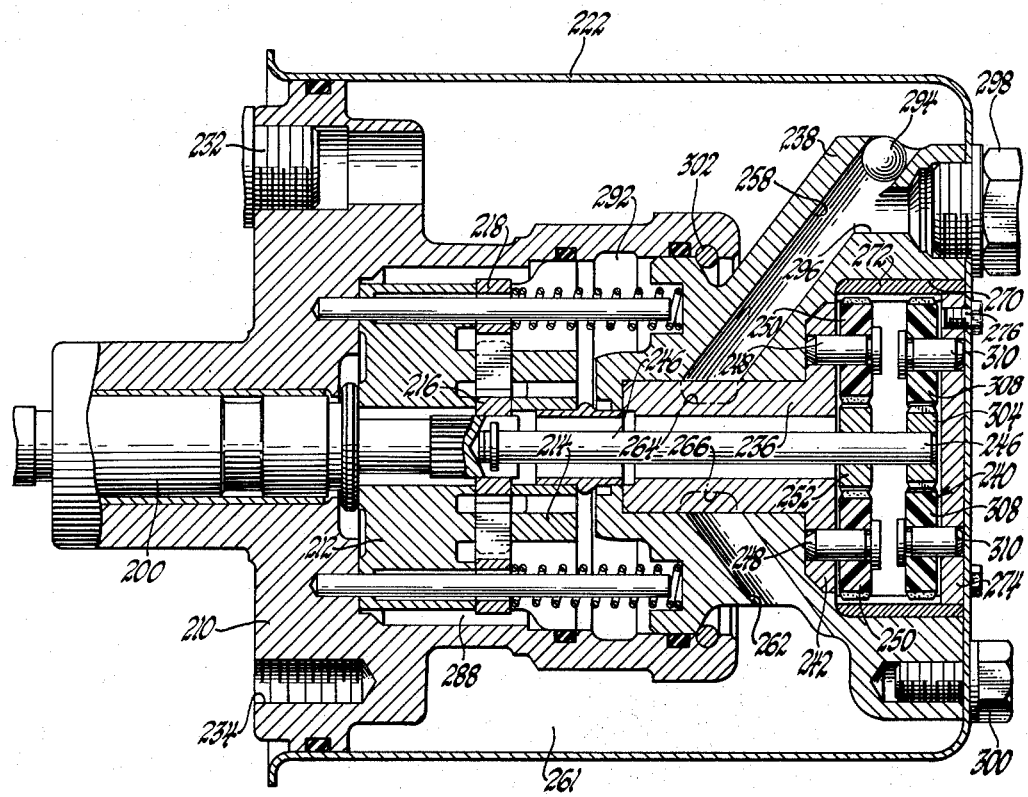
FIGURE 8 is a sectional view looking in the direction of the arrows 8—8 in FIGURE 7.

The pump of FIGURES 6, 7 and 8 is similar to that of the previous figures in that it has a drive shaft 200, a pump body 210, two pressure plates 212 and 214, a rotor 216, a pump ring 218, a relief valve and bypass arrangement generally indicated at 220 and a reservoir casing 222. Some of these details vary slightly from the corresponding details in FIGURES 2 and 3 but only enough to secure a pump with push-pull characteristics instead of a mere intermittent push action. A passage 224 is formed in the body 210 to establish a continuous connection between the two ends of the valve spool 220 in the same manner as passage 75 of FIGURES 2 and 3 but in this case a slot or kerf 226 in the bypass valve is relied upon instead of a slotted tube 70 as shown in FIGURE 2. Also, a plug 228 is used instead of the fitting 48 and this plug is apertured as at 230. A closure nipple 232 and a threaded mounting bore 234 are shown in FIGURE 8. The nipple serves for venting and is provided with a vented closure. The pump rotor and pressure plates are retained as in FIGURES 2 and 3.

Differences in structure are found, as compared with the unit of FIGURES 2 and 3, and a two land valve 236, a valve body 238, the attachment of the reservoir casing 222 and a sun and planet arrangement 240 for rotating the valve 236.

The two land valve 236 bears an end flange 242 and is rotatable in a bore 244 formed in the valve body 238. The valve also is hollow freely to surround an extension drive shaft 246 which is fixed to the shaft 200 to rotate with the latter. The flange 242 carries four spaced and headed stud shafts 248 upon which are mounted four planet gears 250 and these are in mesh with a sun gear 252. The two lands of the valve 236 are bridged at diametrically opposed areas 254 to adapt the valve, upon rotation, to cut off passages or ports 256, 258, 260 and 262 formed in the valve body 238. This valve construction results in two diametrically opposed grooves 264 and 266 being present in the valve.

The valve body 238 has the valve bore and the passages mentioned above, but is also bored as at 270 to receive the sun and planet gear arrangement 240 and a ring gear 272. The latter is in the form of a cylinder rotatable with respect to a circular wall portion 274 and the latter is nonrotatively fixed by means of short bolts 276. The passage 260 leads to the vented reservoir 261 supplied by the casing 222 and is enlarged as at 278 to retain an annular valve seat 280 and a check valve 282 held with relation to its seat by a spring 284 to restrict flow to the chamber 288 and to prevent flow in the other direction. The suction side of the pump or the chamber 288 is connected to the passage 260 by a passage 290 and a tube 292 extending from the passage 290 and leading through the pressure plate 214. The passage 256 is like the passage 178 of FIGURE 2 and connects the valve to the high pressure side or chamber 292. The passage 258 is closed as at 294 and connects with a passage 296 leading to a fitting 298. The latter is a connection to whatever mechanism is to be operated by the pressure pulsations and it also cooperates with a bolt 300 holding the casing 222 in place. A snap ring 302 holds the valve body 238 to the pump body 210. The passage 262 is diametrically opposed to the passage 258 and leads to the reservoir 261.

The sun and planet arrangement not only includes the sun gear 252 and the planet gears 250 but also a second sun gear 304 and a second set of planet gears 308. The two sun gears are keyed to the shaft 246 and the gears 308 are mounted on stub shafts 310 held on the wall portion 274. It will be noted that the stub shafts 248 are at a greater distance from the shaft 246 than are the stub shafts 310 and the gears are proportioned to cooperate with the ring gear 272 to gain the desired rotative speed of the valve 236 with relation to the rotative speed of the shaft 246.

In the operation of the pump of FIGURES 6, 7 and 8, the check valve 282 prevents "starving" of the pump as it permits flow from the reservoir 261 when a vacuum sufficient to overcome the spring 284 is present in chamber 288. It blocks any flow from the suction side to the reservoir. Assuming that the check valve 282 is closed, as is normally the case, rotation of the valve 236 alternately connects the fitting 298 to the suction and high pressure chambers 288 and 292 to gain the "push-pull" effect not realized in the use of the pump of FIGURES 2 and 3.

What is claimed is:

1. A pulsating power unit including a pump body defining an interior chamber closed at one end by a valve body, a drive shaft extending into said chamber from the other end of said pump body and journaled in the latter, an outer casing cooperating with the pump body in defining a low pressure reservoir chamber, two ported pressure plates in said interior chamber, a pump ring clamped between said pessure plates, a vaned pump rotor within said pump ring and fixed to said drive shaft to be driven by the latter, said pressure plates and pump ring cooperating in forming a main low pressure chamber within said interior chamber, one of said pressure plates and said valve body determining a high pressure chamber between them, at least one thru-port in said one pressure plate and leading to said high pressure chamber, said pump body being ported to connect said low pressure reservoir chamber and said main low pressure chamber, a bypass in said pump body connecting said high pressure chamber to said main low pressure chamber, a pressure relief valve controlling said bypass, an outlet leading from said high pressure chamber, an inlet passage leading through said valve body and connected to said high pressure chamber, and rotary valve means controlling said inlet passage and operatively connected to said drive shaft.

2. A pulsating power unit including a pump body with an interior chamber, a valve body closing one end of said interior chamber, a drive shaft journaled in said pump body, a casing cooperating with said pump body in defining a low pressure reservoir chamber, two ported pressure plates and a pump ring between them, the said pump ring being surrounded by an annular low pressure chamber within said interior chamber, a vaned pump rotor within said pump ring and keyed to said shaft, one of said pressure plates and said valve body determining a high pressure chamber between them, a port in said pump body leading from said annular low pressure chamber to said low pressure reservoir chamber, a bypass connecting said high pressure and annular low pressure chambers, a power outlet connection leading from said high pressure chamber, a pressure regulating valve controlling said bypass, an inlet passage leading through said valve body from said reservoir chamber to said high pressure chambers, and valve means controlling said inlet passage and operatively connected to said drive shaft.

3. A pulsating power unit as set forth in claim 2 including geared speed reducing means connecting said drive shaft to said valve means.

4. A pulsating power unit as set forth in claim 2 in which said valve means is a rotary sleeve valve, and speed reducing gearing means connecting said sleeve valve to said shaft.

5. A pulsating power unit as set forth in claim 2 in which said pump body has one side adapted for mounting on a support, and said drive shaft extending outwardly from said one side.

6. A pulsating power unit as set forth in claim 2 in which said casing is in the form of a cup from which one end of said drive shaft extends, and side and end walls of said cup being arranged as walls of said low pressure reservoir chamber.

7. A pulsating power unit including a pump body defining an interior chamber closed at one end by a valve body, a drive shaft extending into said chamber from the other end of said pump body, two ported pressure plates in said interior chamber, a pump ring clamped between said pressure plates, a vaned pump rotor within said pump ring and fixed to said drive shaft to be driven by the latter, said pressure plates and pump ring cooperating in forming a suction chamber within said interior chamber, one of said pressure plates and said valve body determining a high pressure chamber between them, conduit means leading from said valve body to said high pressure chamber, a second conduit means leading from said valve body to said suction chamber, a passage in said valve body leading from the power unit as a power outlet, rotary valve means in said valve body and connected to said drive shaft to be driven thereby, and said rotary valve means being arranged alternately to connect said power outlet passage with said suction and high pressure chambers.

8. A pulsating power unit as set forth in claim 7 including a sun and gear arrangement connecting said drive shaft to said valve means.

9. A pulsating power unit as set forth in claim 7 including a cup-like casing partially enclosing said pump body and containing said valve body, and said casing being fixed to the latter.

10. A pulsating power unit as set forth in claim 7 including a casing cooperating with said valve body in forming a closed reservoir, a supply passage in said unit connecting said unit to said suction chamber, and a check valve in said supply passage preventing flow from said suction chamber to said reservoir.

11. A pulsating power unit including a pump body and a valve body cooperating to define an interior chamber, a drive shaft extending through said interior chamber and journaled for rotation, two ported pressure plates and a pump ring interposed between said plates in said chamber, a vaned pump rotor within said pump ring, one of said pressure plates cooperating with said pump body in defining a suction chamber, the other of said pressure plates cooperating with said valve body in defining a high pressure chamber, a work output passage leading from said valve body, a high pressure passage in said valve body leading from said high pressure chamber, a lower pressure passage leading into said valve body, rotary valve means in said valve body connected with said pump rotor to said shaft to be rotated by the latter, and said rotary valve means being arranged alternately to connect said work output passage with said lower pressure passage and said high pressure chamber.

12. A pulsating power unit including a pump body and a valve body cooperating to define an interior chamber, a drive shaft journaled in said pump body, a rotary pump in said chamber and having a high pressure zone partially defined by said valve body and adapted to serve as a high pressure side of said pump, a low pressure zone in said pump body in communication with the suction side of said pump, a work output passage leading from said valve body, rotary valve means in said valve body and connected to said shaft to rotate simultaneously with operation of said rotary pump, and the arrangement being such that said rotary valve means upon rotation is adapted alternately to connect said work output passage to said high pressure zone and low pressure zone.

13. A pulsating power unit as set forth in claim 12 including an outer casing enclosing a vented fluid reservoir and a restricted connection from said reservoir to said low pressure zone.

No references cited.